United States Patent [19]

Violante et al.

[11] Patent Number: 5,740,247
[45] Date of Patent: Apr. 14, 1998

[54] AUTHORIZED CELLULAR TELEPHONE COMMUNICATION PAYMENT REFILL SYSTEM

[75] Inventors: Anthony F. Violante, Stratford; Ronald P. Sansone, Weston, both of Conn.

[73] Assignee: Pitney Bowes Inc., Stamford, Conn.

[21] Appl. No.: 577,312

[22] Filed: Dec. 22, 1995

[51] Int. Cl.⁶ .......................................... H04L 9/00
[52] U.S. Cl. .................................. 380/24; 380/25
[58] Field of Search .................... 380/23–25, 44, 380/49

[56] References Cited

U.S. PATENT DOCUMENTS

| | | |
|---|---|---|
| 3,255,439 | 6/1966 | Simjian . |
| 3,428,948 | 2/1969 | Simjian . |
| 3,501,744 | 3/1970 | Simjian . |
| 3,716,698 | 2/1973 | Simjian . |
| 3,792,446 | 2/1974 | McFiggins et al. . |
| 3,890,599 | 6/1975 | Simjian . |
| 3,977,222 | 8/1976 | Luperti et al. . |
| 3,998,079 | 12/1976 | Uthenwoldt . |
| 4,097,923 | 6/1978 | Eckert, Jr. et al. . |
| 4,122,532 | 10/1978 | Dlugos et al. . |
| 4,138,735 | 2/1979 | Allocca et al. . |
| 4,218,011 | 8/1980 | Simjian . |
| 4,222,518 | 9/1980 | Simjian . |
| 4,226,360 | 10/1980 | Simjian . |
| 4,249,071 | 2/1981 | Simjian . |
| 4,258,252 | 3/1981 | Simjian . |
| 4,268,817 | 5/1981 | Simjian . |
| 4,317,028 | 2/1982 | Simjian . |
| 4,376,299 | 3/1983 | Rivest . |
| 4,436,992 | 3/1984 | Simjian . |
| 4,447,890 | 5/1984 | Duwel et al. . |
| 4,787,045 | 11/1988 | Storace et al. . |
| 4,811,234 | 3/1989 | Storace . |
| 4,812,992 | 3/1989 | Storace . |
| 4,827,508 | 5/1989 | Shear .................... 380/25 |
| 4,864,506 | 9/1989 | Storace . |
| 4,977,594 | 12/1990 | Shear .................... 380/25 |
| 5,010,571 | 4/1991 | Katznelson .............. 380/25 |
| 5,050,213 | 9/1991 | Shear .................... 380/25 |
| 5,051,564 | 9/1991 | Schmidt . |
| 5,058,025 | 10/1991 | Haines et al. . |
| 5,077,660 | 12/1991 | Haines . |
| 5,091,942 | 2/1992 | Dent ..................... 380/44 |
| 5,136,648 | 8/1992 | Olson et al. . |
| 5,153,919 | 10/1992 | Reeds, III et al. ........ 380/44 |
| 5,159,634 | 10/1992 | Reeds, III ............... 380/45 |
| 5,172,414 | 12/1992 | Reeds, III et al. ........ 380/44 |
| 5,204,902 | 4/1993 | Reeds, III et al. ........ 380/23 |
| 5,224,046 | 6/1993 | Kim et al. . |
| 5,233,531 | 8/1993 | Schulz . |
| 5,237,506 | 8/1993 | Horbal et al. . |
| 5,237,612 | 8/1993 | Raith .................... 380/23 |
| 5,239,294 | 8/1993 | Flanders et al. . |
| 5,241,598 | 8/1993 | Raith .................... 380/23 |
| 5,243,654 | 9/1993 | Hunter . |
| 5,247,575 | 9/1993 | Sprague et al. . |
| 5,282,250 | 1/1994 | Dent et al. .............. 380/23 |
| 5,291,543 | 3/1994 | Freese et al. . |
| 5,301,223 | 4/1994 | Amadon et al. . |
| 5,301,234 | 4/1994 | Mazziotto et al. ........ 380/23 |
| 5,309,363 | 5/1994 | Graves et al. . |
| 5,309,501 | 5/1994 | Kozik et al. . |
| 5,319,705 | 6/1994 | Halter et al. ............ 380/25 |
| 5,325,418 | 6/1994 | McGregor et al. . |
| 5,329,573 | 7/1994 | Chang et al. . |
| 5,335,278 | 8/1994 | Matchett et al. ......... 380/23 |
| 5,359,642 | 10/1994 | Castro ................... 379/121 |
| 5,369,401 | 11/1994 | Haines . |
| 5,377,264 | 12/1994 | Lee et al. ............... 380/25 |
| 5,377,267 | 12/1994 | Suzuki et al. ........... 380/23 |
| 5,377,268 | 12/1994 | Hunter ................... 380/25 |
| 5,394,469 | 2/1995 | Nagel et al. . |
| 5,481,611 | 1/1996 | Owens et al. ............ 380/23 |
| 5,513,245 | 4/1996 | Mizikovsky et al. ...... 380/49 |
| 5,551,073 | 8/1996 | Sammarco ............... 380/23 |

*Primary Examiner*—Salvatore Cangialosi
*Attorney, Agent, or Firm*—Ronald Reichman; Melvin J. Scolnick; Robert Meyer

[57] ABSTRACT

This invention overcomes the disadvantages of the prior art by providing cellular telecommunications systems that utilize encryption and employ encrypted seed number signals to enable various payment plans for access and payment.

17 Claims, 4 Drawing Sheets

FIG. 2

AUTHORIZED CELLULAR TELEPHONE COMMUNICATION PAYMENT REFILL SYSTEM

CROSS REFERENCE TO RELATED APPLICATIONS

Reference is made to commonly assigned copending patent application Docket No. E-349 filed herewith entitled "Authorized Cellular Telephone Communication Access And Verification Control System" in the names of Anthony F. Violante and Ronald P. Sansone and Docket No. E-432 filed herewith entitled "Authorized Cellular Voice Messaging And/Or Analog or Digital Data Communication Access And Verification Control System" in the names of Ronald P. Sansone and Anthony F. Violante; Docket No. E-434 filed herewith entitled "Cellular Telephone Manifest System" in the names of Ronald P. Sansone and Anthony F. Violante; Docket No. Docket No. E-469 filed herewith entitled "Metered Payment Cellular Telephone Communication System" in the names of Gary G. Hansen, David W. Riley, David K. Lee, Frederick W. Ryan, Jr. Nathan Rosenberg, Anthony F. Violante and Ronald P. Sansone; and Docket No. E-470 filed herewith entitled "A Method For Communicating With A Voice Response Unit Over A Cellular Telephone Network" in the names of Steve Kovlakas, Steven Vasquez, Jean-Hiram Coffy and Michael Wilson.

FIELD OF THE INVENTION

The invention relates generally to the field of payment for telecommunications systems and more particularly to cellular telecommunications messaging of voice and data that utilize encryption and employ encrypted seed number signals for access and payment.

BACKGROUND OF THE INVENTION

Cellular mobile radio or cellular communications systems have been developed for mobile communications. Typically, the planned service area is divided into a number of geographical areas or cells. The available frequency channels for the service area are divided among the cells. A cellular telephone for example communicates with a nearby cell base station via one of the several radio frequency channels assigned to the cell. Conventional circuits link the base station to the mobile telecommunications switching office, which switches calls between the cellular telephone system and the rest of the telephone network.

Currently cellular telephone users are paying for their phone calls by each phone call billed to their account. The foregoing is accomplished by the use of a central billing system. The central billing system logs each individual call and uses one or more of the following to determine the charge for the call: the duration of the call, the distance of the call, the origination point of the call, method of payment and time of day, etc.

The central billing system accumulates the call data, including the charges for each cellular telephone account. Periodically a bill is sent to the entity responsible for the cellular account. When payment is received, the account is deemed current.

A problem with the foregoing payment method is the management of past due accounts. Currently cellular telephone companies are losing large amounts of money due to delinquent account and unpaid bills.

As a result of the foregoing, potential cellular telephone customers that are deemed high credit risks are denied access to the cellular network.

Another problem of the prior art is that the possessor (teenager or salesman) of the cellular telephone may continuously use the phone and accumulate charges that amount desired by the owner (parent or employee) of the cellular account.

SUMMARY OF THE INVENTION

This invention overcomes the disadvantages of the prior art by providing cellular telecommunications systems that utilize encryption and employ encrypted seed number signals to enable various payment plans for access and payment.

The apparatus of this invention may meter payment by the number of calls, by the number of units; time; distance; or flat rate or by the amount of funds (dollars, marks, pounds, etc.) to be stored within the secured metering device. The foregoing permits the owner of the cellular account to control the maximum expenditures of the possessor of the cellular telephone. This invention also enables the telephone companies to place cellular telephones in high risk accounts by synchronizing the amount of money given to the telephone company with the value of the cellular phone calls made. Thus, no management of bad debts and delinquent accounts are required.

DETAILED DESCRIPTION OF THE PREFERRED EMBODIMENT

Figure 1:
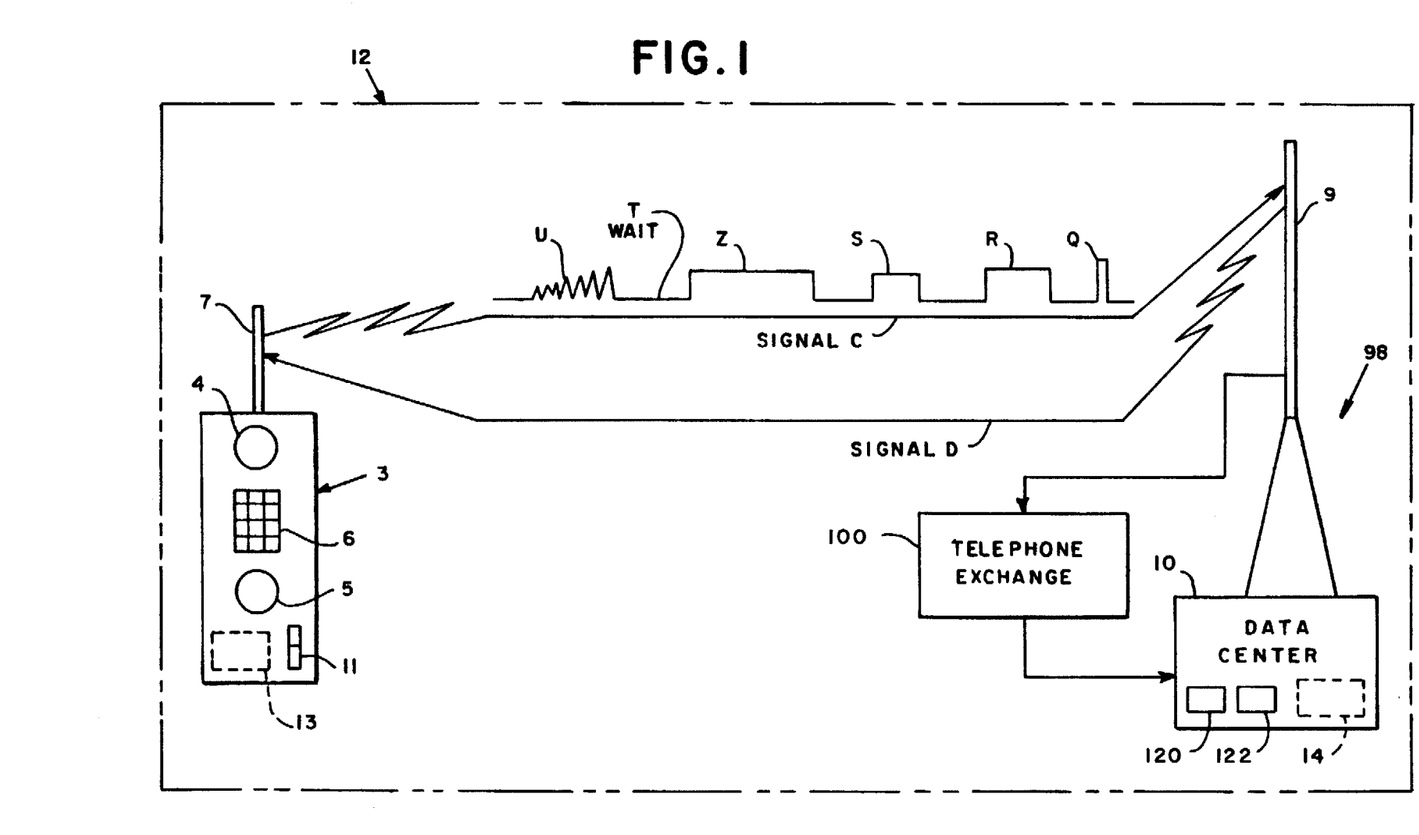
FIG. 1 is a drawing of the cellular telecommunications network of this invention.

Referring now to the drawings in detail and more particularly to FIG. 1, the reference character 12 represents the cellular telecommunications network of this invention. Network 12 includes: a cellular telephone 3, that has a speaker 4, a mouthpiece 5, a keypad 6, an antenna 7, a power switch 11, a keypad 204, that has buttons 208, 210, 212 and 213 and a device 13 for encrypting component Z of Signal C (device 13 will be hereinafter described in the description of FIG. 2); a base station 98, that includes an antenna 9 and a data center 10 that includes a computer 120 that handles account data, a answer back unit 122 that composes a voice response to incoming messages, a decryption device 14 (device 14 will be hereinafter described in the description of FIG. 3); and a telephone exchange 100.

When someone would want to place a telephone call on telecommunications network 12, they would activate power switch 11 and enter the telephone number they wish to call on keypad 6. Cellular telephone 3 will transmit Signal C via antenna 7. Signal C has six components: Q; R; S; Z; T; and U. Component Q contains handshake information to make cellar telephone 3 compatible with base station 98 and component R contains the manufactures identification number for cellular telephone 3. Component S contains the telephone number of cellular telephone 3 and component Z contains an encrypted message that changes from transmission to transmission. Component Z will be more fully described in the description of FIGS. 3 and 4. Component T is a delay and component U is the phone number entered into keypad 6. Signal C is received by antenna 9 and processed by data center 10. The foregoing transmitted characters and numbers are checked at base station 98 to determine if cellular telephone 3 is allowed to use the base station selected and that the telephone number of the cellular telephone being used has the correct manufactures identification number. If Signal A contains the correct information about cellular telephone 3 i.e., the telephone number and manufactures identification number are found to be correct, the base station 98 further determines if the time elapsed and distance traveled by cellular telephone 3 from the last cellular telephone call are feasible. If, cellular telephone 3 traveled a feasible distance in the time elapsed from the last telephone call, device 14 reads component Q. If component Q contains the correct information, base station 98 transmit Signal D to antenna 7 and connects cellular telephone 3 to telephone communications network 12, via telephone exchange 100.

Signal C is transmitted over specified radio frequencies and always contains different information, component Z will always have different information. Hence, even if Signal C is intercepted by conventional off the shelf electronic receiving equipment, Signal C would not be able to be used by a thief to make another unauthorized cellular telephone calls.

Figure 2:
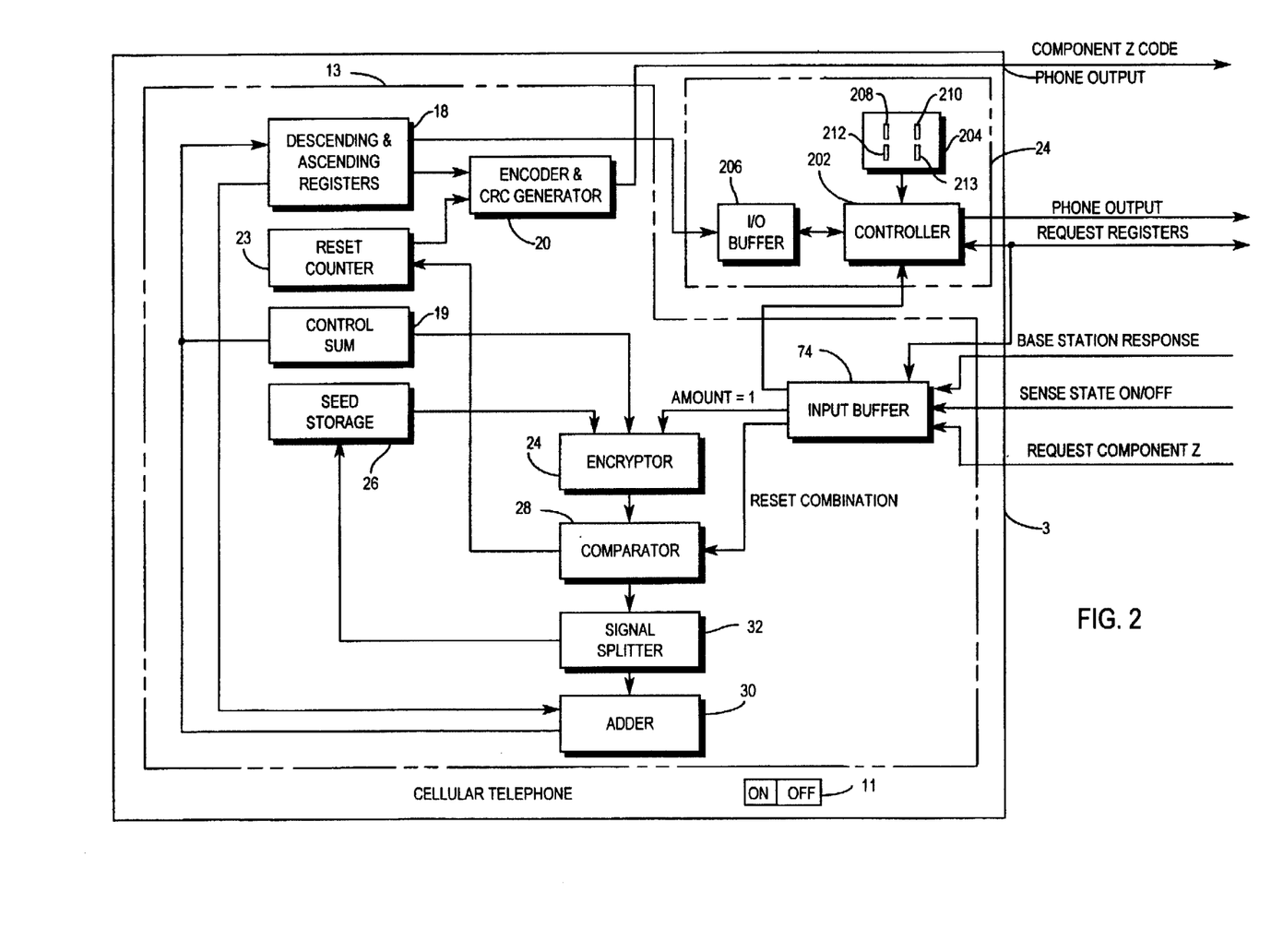
FIG. 2 is a block drawing of the cellular phone portion of the apparatus of this invention.

FIG. 2 is a block drawing of the cellular phone portion of the apparatus of this invention. Encryption device 13 includes: descending and ascending registers 18; reset counter 23; control sum 19; seed storage 26; encoder and cyclical redundancy character generator 20; encryptor 24; comparator 28; signal splitter 32; adder 30; and input buffer 74.

Register 18 contains an ascending and descending register. Register 18 is coupled to an encoder and cyclical redundancy character generator 20 as is reset counter 23. Encoder and cyclical redundancy character generator 20 operates upon the information from register 18 and from the reset counter 23 to generate an authorization code (component Z of Signal C). Component Z is sent to the output of cellular phone 3 and transmitted to base station 98. How are components Q, R, S, T and U are buffered and sent to base station 98 by the currently used cellular telephone processes known to those skilled in the art.

The authorization code is utilized in conjunction with the remote resetting of device 14 in communication with base station 98 (shown in FIG. 4), the base station 98 may be accessed by device 14 over an insecure radio frequency.

The authorization code provides a level assurance that information has been accurately transferred between user of cellular telephone 3 and base station 98. Encoder and cyclical redundancy character generator 20 are of the type which process information to provide a detection scheme for errors which may occur in transferring information.

When power switch 11 of cellular phone 3 is turned on, a amount equal to one (1) is entered by cellular phone 3 at input buffer 74. The amount is applied to an encryptor 24. Additionally, applied to the encryptor 24 is information from the control sum register 19, and a presorted seed number signal from seed storage 26. The seed number signal is stored in an unencrypted form. Encryptor 24 can be any one of a large number of encrypting devices including those devices which use the Data Encryption Standards described in FIPS PUB 46, dated Jan. 15, 1977 and published by the United States Department Of Commerce, National Bureau of Standards, herein incorporated by reference. In addition, a standard encryption scheme, such as the RSA encryption technique, can also be used for encryptor 24. It will be obvious to one skilled in the art that different public and private encryption keys may be utilized. Encryptor 24 generates an encrypted signal based upon the amount equal to one (1) received from input buffer 74, the information from control sum register 19 and the seed number signal from seed storage register 26. The output signal of encryptor 24 is applied to a comparator 28. Comparator 28 compares the signal generated by encryptor 24 with a signal received from base station 98 via input buffer 74.

If comparator 28 determines that the entered combination coincides with the combination generated by encryptor 24, comparator 28 generates a signal to signal splitter 32. Signal splitter 32 transmits a signal to seed storage 26 and adder 30. Seed storage 26 would typically store numbers having from 6 to 128 digits. It would be obvious to one skilled in the art that additional digits may be utilized by seed storage 26. The output of adder 30 is applied to increment the descending register in descending and ascending registers 18 and increment control sum 19. A successful comparison by comparator 28 also causes a new seed number to be stored in seed storage 26 for the next phone call. Seed storage 26 will transmit the new seed number to encryptor 24 for the next phone call.

Reset counter 23 is incremented by the output of comparator 28 only when comparator 28 has a successful comparison. Reset counter 23 may be one of many types including a modulo 2 or modulo 16 counter. Counter 23 provides an input signal to encoder and cyclical redundancy character generator 20 such that the authorization code signal (component Z of Signal C) contains information as to whether device 14 has been successfully reset.

Refill device 214 is utilized for the addition of funds or units to cellular telephone 3. Device 214 includes: a keyboard 204, that has buttons 208, 210, 212 and 213 and; a controller 202 that is coupled to the output of keypad 204 and one of the outputs of input buffer 74; and an input/output buffer 206. Button 208 is used to enter the contents of ascending register 18 into controller 202 and button 210 is used to enter the contents of descending register 18 into controller 202. Button 212 is used to enter the access code number into controller 202 and button 213 is used to acknowledge receipt of the new access control number. The operation of buttons 208, 210, and 213 will be more fully described in the description of FIG. 4. The fourth input to input buffer 74 is the register request line that is coupled to the output of computer 120. The aforementioned register request signal is buffered by buffer 74 and coupled to one of the inputs of controller 202. One of the outputs of controller 202 is coupled to the input of input/output buffer 206 and one of the other outputs of controller 202 is coupled to one of the inputs of descending and ascending registers 18. One of the outputs of descending and ascending registers 18 is coupled to the input of input/output buffer 206. The other output of controller 202 is coupled to the output of cellular telephone 3.

Figure 3:
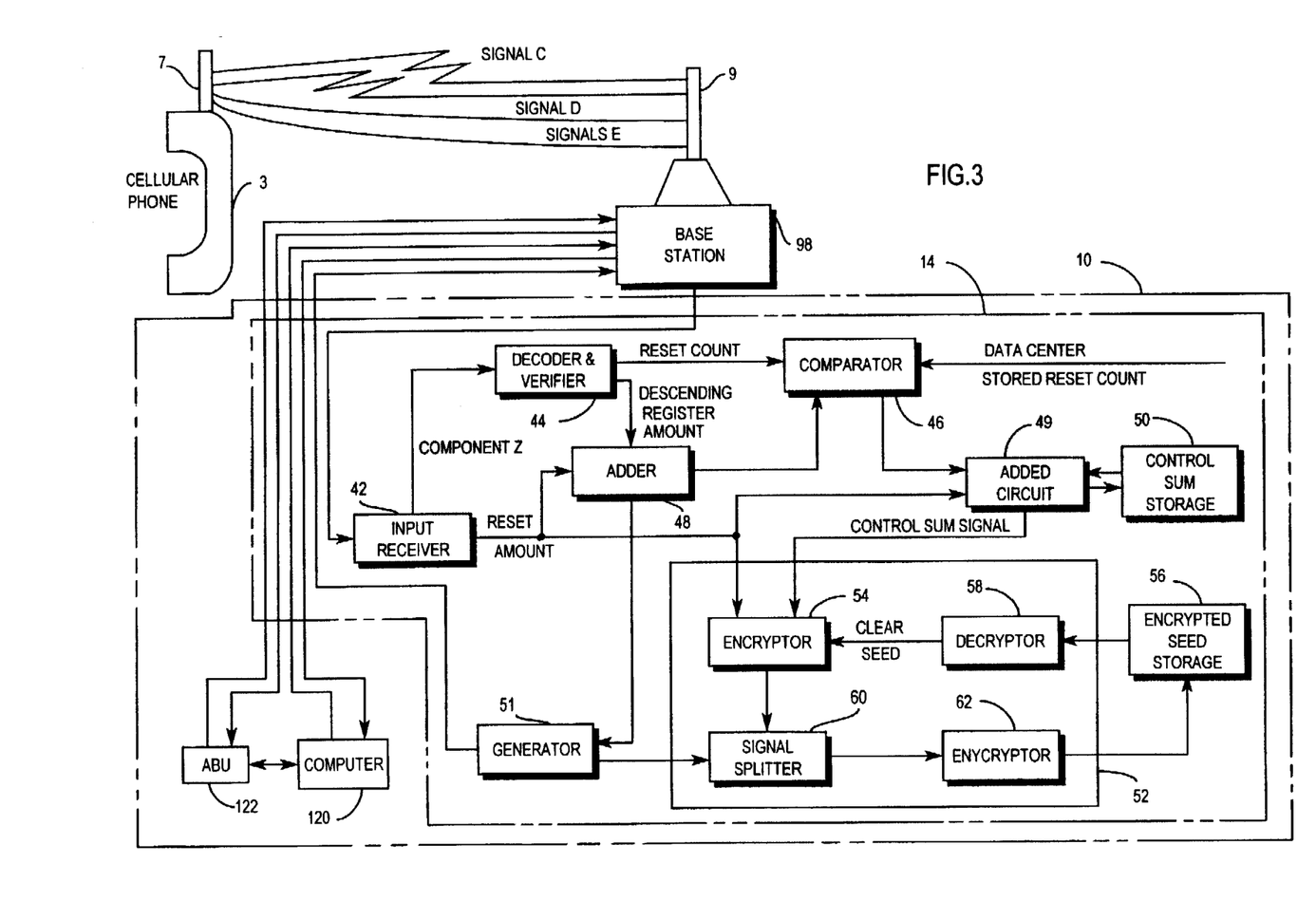
FIG. 3 is a block drawing of the cellular base station portion of the apparatus of this invention.

FIG. 3 is a block drawing of the cellular base station 98 portion of the apparatus of this invention receiving a phone call from cellular phone 3 via antenna 7. Antenna 7 transmits Signal C (shown in FIG. 2) to antenna 9 of base station 98. Data center 10 receives and process component Z of Signal C from base station 98. Component Z of Signal C is received by an input receiver 42 and coupled to a decode and verify 44.

Decode and verify 44 decodes component Z of Signal C to generate the reset count and the descending register amount. Decoder 44 further verifies the cyclical redundancy characters to insure that the data has been accurately transmitted. The reset count signal is applied to comparator 46 wherein the decoded reset count signal is compared to the reset count signal stored in decoder and verifier 44. The decoded descending register amount signal is applied to an adder 49 with the reset amount signal from receiver 42. The output of adder 48 is coupled to comparator 46. If the reset count signal from decode and verifier 44 compares correctly with the output of adder 49, comparator 46 enables an adder circuit 49. Adder circuit 49 is coupled to control sum storage register 50 to provide the current control sum.

The physically sealed unit 52 is sealed in a manner to prevent access to the circuitry by base station 98 or data center 10 personnel. The sealed unit 52 results in enhanced security for the validation of component Z of Signal C because the base station and data center personnel do not have access to the encryption circuit and certain unencrypted data associated with the resetting of cellular phone 3.

The control sum signal from adder 49 is applied to an encryptor 54 within sealed unit 52 as is the reset amount from input receiver 42. Additionally applied to encryptor 54 are unencrypted seed number signals. The encryptor 54 may be any one of a large number of encrypting devices such as those employing the data encryption standard previously identified. However, it should be noted that encryptor 54 is identical in its operation to encryptor 24 contained within cellular phone 3.

The seed number signal applied to encryptor 54 is stored in data center 10 so that it may be accessible by data center personnel. However, the seed number signal is stored in an encrypted form in encrypted seed storage 56. This is the only form of the seed signal to which data center personnel have access. The encrypted seed signal from encrypted seed storage 56 is applied to decryptor 58. Decryptor 58 need not be similar to or compatible with the form of encryption provided by encryptor 54 and encryptor 24 (FIG. 3) in cellular phone 3. Decryption device 58 may be any one of the large number of devices available to decrypt the encrypted seed number signal and to provide an unencrypted, clear seed number signal which is the same as the seed number signal stored in seed storage 26 (FIG. 3) of cellular phone 3. Encryptor 54 generates an encrypted output signal which is applied to signal splitter 60. Signal splitter 60 splits the encrypted output signal from encryptor 54 into a first signal which is transmitted via generator 51 to base station 98. Antenna 9 of base station 98 transmits the above first signal as Signal D to input buffer 74 (FIG. 3) of cellular phone 3.

Splitter 60 additionally applies part of the encrypted output signal from encryptor 54 to encryptor 62 to generate a new encrypted seed number signal. Encryptor 62 encrypts the seed number signal in a manner so that it is compatible with the decryptor 58. The new encrypted seed number signal is transmitted from within the sealed unit 52 to the encrypted seed storage 56 which is accessible to the data center personnel.

The output of generator 51 is also connected to one of the inputs of computer 120 and one of the outputs of computer 120 is coupled to base station 98. Another output of computer 120 is coupled to one of the inputs of voice answer back unit 122. Another input to computer 120 is one of the outputs of base station 98 and another input to voice answer back unit 122 is one of the outputs of base station 98. Computer 120 and voice answer back unit 122 communicate with cellular telephone 3 via signals E.

Figure 4:
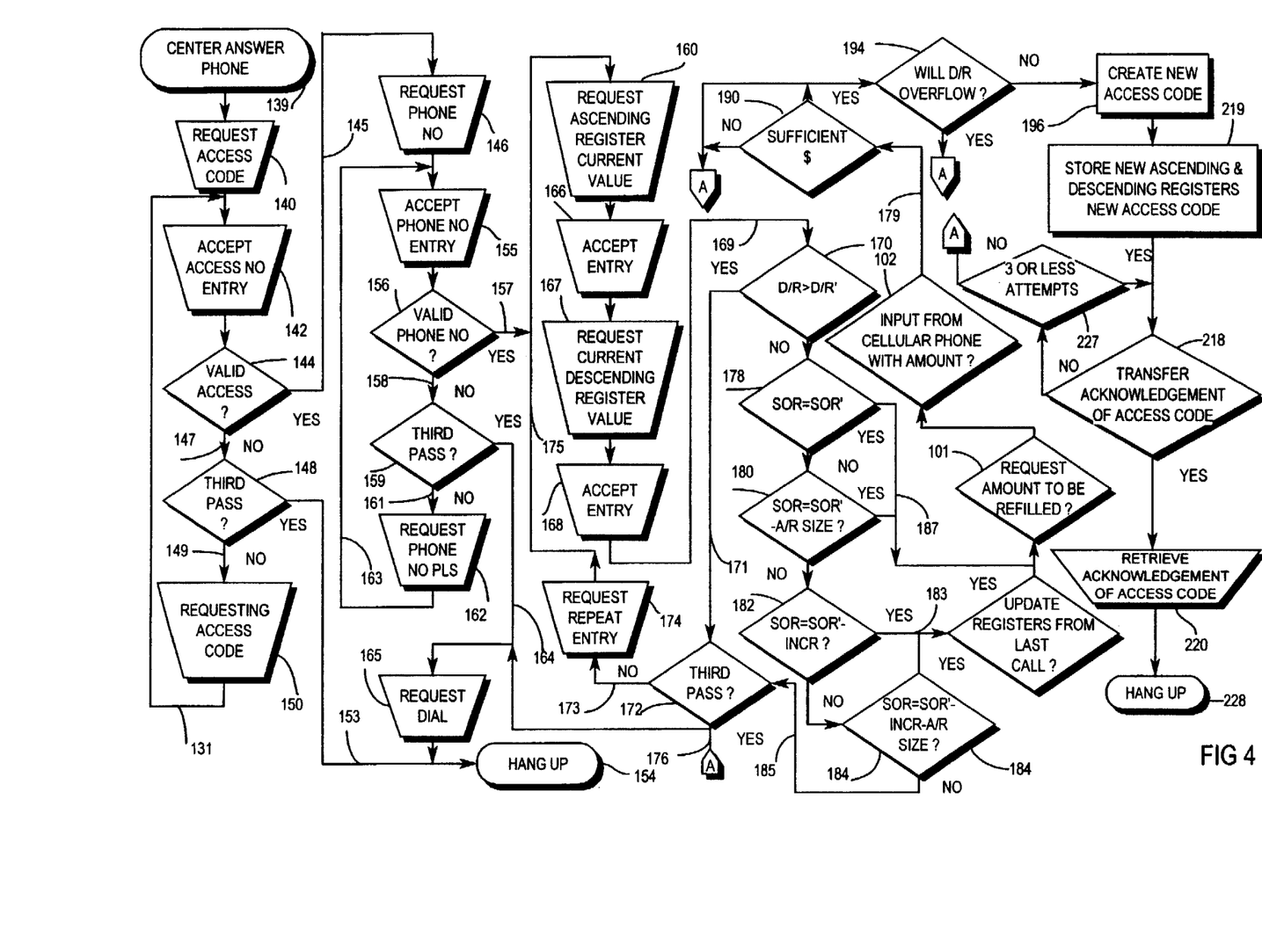
FIG. 4 is a flow chart illustrating the manner in which data center 10 handles an incoming call from a cellular telephone user to recharge or add funds to cellular telephone 3.

FIG. 4 is a flow chart illustrating the manner in which data center 10 handles an incoming call from a cellular telephone user to recharge or add funds to cellular telephone 3. When a user determines that his cellular telephone 3 needs recharging or has no money, he keys in the telephone number of data center 10 on his telephone 3. The data center 10 answers, as indicated at answer phone 139, to complete the telephone connection. After data center 10 verifies that component Z of signal C, hereinbefore described in the description of FIGS. 1–3 is authentic, micro-computer 120 located in data center 10 controls answer back unit 122 (FIG. 1) to compose a voice response as indicated by request access code number 140 for transmission back to the caller requesting a numeric input uniquely identifying the caller or uniquely identifying cellular telephone 3. This numeric input request may be for an access code number, or the like which is also held in computer memory. Micro-computer 120 then converts to an input mode, illustrated by input block 142, awaiting receipt of a predetermined number of digits, representing for example the callers access code number. The cellular telephone user then keys in his access code number using the numeric keys on his touch tone cellular telephone 3 or initiates a process within telephone 3 (by pressing button 212 on keypad 204) to generate equivalent tones. Computer 120 then searches its memory to determine if the received access code number is stored therein, as represented by valid access code number block 144. If computer 120 locates a comparable access code number in its memory, meaning that the received access code number is valid, the program exits block 144, on branch 145 to request phone number 146.

On the other hand, if computer 120 fails to locate in its memory an access code number comparable to the one received from the cellular telephone caller, the program exits decision block 144 on branch 147 to a second try at block 148. Here computer 120 checks to determine how many chances has been given to input a valid access code number. If the caller has had less than three attempts to enter a valid access code number, the program exit block 148 on branch 149 to requesting access code number 150, wherein computer 120 controls the voice answer back unit 122 to formulate a voice transmission back to the caller informing him, in effect, that his entry is not valid and to please reenter his access code number. The program, as indicated by branch 151, reverts back to the input of accept access number entry 142, wherein computer 120 is again conditioned to accept an access code number entry. During the third pass of block 148, when the caller has failed to enter a valid access code number, the decision is made that the call being processed is probably spurious. Thereupon, the program exits third pass 148 on branch 153 pursuant to breaking the telephone connection with the caller as indicated at hang up 154.

If on one of his allocated three tries, the cellular telephone caller has entered a valid access code number, computer 120 goes into an output mode, as indicated by request phone number 146, wherein the voice answer back unit 122 is controlled to compose a voice transmission requesting an entry of a second multi-digit number, such as an phone number or account number, uniquely identifying the cellular telephone 3 to be recharged, as indicated by accept phone number entry 155, computer 120 converts to the input mode awaiting receipt of the numeric entry of the phone number of cellular telephone 3. Upon entry of the cellular telephone phone number, computer 120 determines as represented by valid phone number 156, whether or not the callers account file held in memory and file identified by the phone number includes a cellular telephone access code number identical to the one entered by the caller, it being appreciated that the caller may have more than one cellular telephone. If identity is found, the program exits valid phone number 156 on branch 157 leading to request ascending register current value 160. On the other hand, if identity is not found, the program exits valid phone number 156 on branch 158 leading to a second try at block 159. Block 159 determines how many attempts the user has been afforded to enter a valid cellular telephone number after having entered a valid access code number. If the user has had less than three such attempts, the program exits block 159 on branch 161, wherein computer 120 enters an output mode, indicated by request phone number block 162, to control voice answer back unit 122 to compose a voice transmission to the effect that the cellular telephone number entry is not valid and to enter it again. The program reverts back, over branch 163 to the input of accept phone number entry 155 as computer 120 awaits another attempt by the user to enter a valid cellular telephone number. If the caller has not done so on three passes, through block 156, the program exits third pass 159 on branch 164 to request dial 165, wherein computer 120 again advises the cellular telephone caller that his cellular telephone number entry is not valid and formulates the voice instruction to call a particular telephone number for personal assistance. Computer 120 thereupon breaks telephone connection with the caller, as represented at hang up 154. The philosophy in this situation, is that since the caller previously entered a valid access number, it is probably not a spurious call. Thus, the caller is requested to call the personal assistance phone number in determining why the caller is unable to enter a valid cellular telephone number after three attempts, having previously entered a valid access number.

Assuming the caller has entered a valid access number as well as a valid cellular telephone number, computer 120, as indicated in request ascending registers current value 160 controls voice answer back unit 122 to formulate a voice transmission requesting the caller to press button 208 on keypad 204 in order to enter the reading in the ascending register 18 of the identified cellular telephone 3 to be recharged. The program contained in computer 120 then progresses to accept ascending register entry, as indicated in input block 166, awaiting entry of the ascending register 18 reading. Upon receipt, the program goes to the output mode to control the voice answer back unit 122 to formulate the voice transmission requesting the user to press button 210 on keyboard 204 (FIG. 2) in order to enter the reading in the descending register 18 as indicated by request current descending register value 167. The program contained in computer 120, as indicated, and input block 168 awaits the entry of the users descending register 18 reading and upon receipt, the program proceeds over branch 169 to decision block 170. Here the program of computer 120 checks the descending register 18 reading just entered with the reading of the descending register stored in the computer 120's memory under the entered cellular telephone number on the occasion of the previous charge of the user cellular telephone. Since descending register 18 is decremented by the amount of calls, amount of funds or units of calls issued with each cellular telephone cycle, the current descending register reading can not be greater than the descending register 18 reading stored in computer memory 120. If, however, this is found to be the case, the program exits decision block 170 on branch 171 to a decision block 172 wherein computer 120 checks to determine how many times the current descending register 18 reading has been found to exceed the previous descending register reading. If the number of passes through decision block 172 is less than or equal to three, the program exits on branch 173 to request repeat entry 174. Computer 120 then controls the voice answer back unit 122 to compose a voice response, advising the cellular telephone caller, in effect, that his descending register entry is not valid and to repeat the entries of the ascending and descending register readings of cellular telephone 3. The program exits request repeat entry 174 on branch 175 and reenters request ascending register current value 160 and proceeds with input/ output blocks 166, 167 and 168 to block 170. After the third pass through this portion of the program, if the current descending register reading 18 is still found to be larger than the stored descending register reading, the program exits third pass block 172 on branch 176 to request dial 165, wherein the voice answer back unit 122 is controlled by computer 120 to formulate a voice transmission inviting the caller to call for human assistance.

If the descending register 18 reading that was entered by the caller is not larger than the previous descending register 18 reading held in computer 120 memory, the program exits decision block 170 and enters sum of registers (SOR) equal sum of registers prime (SOR') 178. Computer 120 sends the ascending and descending register reading (SOR) entered by the caller and compares this total with the sum of the same two register 18 readings (SOR') stored in computer 120 memory as the result of the last recharge of the identified cellular telephone 3. If everything is in order, the foregoing two totals should be equal. This is seen from the fact that as the cellular telephone 3 is used subsequent to the last recharging, the amounts of charge by which descending register 18 is decremented are equal to amount of charge by which the ascending register 18 is incremented. Consequently, the total of these two register readings should remain constant between rechargings. If the two sums are equal, the program exits decision block 178 on branch 179 where some additional checks are performed associated with the cellular telephone to be recharged.

On the other hand, if the sum of the entered registered readings and the register readings held in computer 120 memory are not equal, computer 120 performs one or more additional checks in an effort to determine if the inequality detected in SOR=SOR' 178 arose for reasons other than erroneous digit entry by the cellular telephone caller.

In the event of any inequality, computer 120 exits SOR=SOR' 178 and enters SOR=SOR'-A/R size 180, wherein, computer 120 checks to see if ascending register 18 of the identified cellular telephone 3 overflowed since the last recharging. To perform this check, computer 120 compares the sum of the register readings 18 entered by the caller, to the sum of the register readings held in the memory of computer 120, minus the size of the ascending register. That is, if the ascending register has a six digit capacity, for example, capable of registering readings from 0 to 999,999, its register size is 1,000,000. It will be seen that if the ascending register 18 is incremented through 0, since that last recharging of cellular telephone 3, this event can be accommodated in a sum of registers check by subtracting the sum of the stored register readings, the register size, i.e., 1,000,000. This computation compensates for the fact that the ascending register has overflowed and block 180 will detect an equality. In such event, the program exits on branch 179 pursuant to issuing the next access code number to the caller. If ascending register overflow is not the reason for the detected inequality then the sum of the registers check, the program enters SOR=SOR' increment block 182, wherein computer 120 checks to see if the caller failed to actually recharge cellular telephone 3 the last time he called.

and increment his descending register with the amount of allocated additional money or units, by depressing button 210 on keypad 204. As will be seen, computer 120, at the time of issuing each new access code number, increments descending register readings held in memory with the amount of additional funds or units to which the caller is given access when queried in block 101, for the amount of funds or units in which the caller wants to enter in cellular telephone 3, and if the caller does not complete recharge of the cellular telephone, the sum of registers check performed in decision block 178 and 180 will have failed. To determine if this situation exists, computer 120 compares the sum of the register readings entered by the caller with the sum of the register readings held in computer 120 memory, minus the increment of funds or units previously allocated to the caller. If an equality is now detected in block 182, the program exits on branch 183, and computer 120 proceeds to issue updates to registers 181 by the increment stored in the memory that was given on the previous call, but which had not been entered into the controller 202 for some reason. Therefore, he is not charged the same increment of funds or units again. The caller may then recharge his cellular telephone with the amount that he wants refilled in block 101.

If the check illustrated by decision block 182 fails, computer 120 makes one final check, illustrated by SOR= SOR'-INCR a/r size 184, to determine that the failure of the sum of registers check illustrated in blocks 178, 180, and 182 was for a reason other than an erroneous digit entry by the caller the failure of the caller to press button 208 or 210. This final check involves testing to see the reason when the sum of registers inequality arose, across because the caller's ascending register overflowed and he did not complete the recharge of his cellular telephone the last time he called and was given the access code number permitting him to recharge cellular telephone 3. This check is carried out by comparing the sum of the registers entered by the caller and the sum of the registers held in computer memory minus the allocated increment of funds or units minus the ascending register size. If an equality is now detected, the program exits block 184 on branch 183. On the other hand, if an equality is not obtained, the program exits block 184 on branch 185 to block 172, which check to see how many passes through decision blocks 170, 178, 180, 182 and 184 the computer 120 has executed for this particular caller. If the number of passes is less than or equal to 3, the program exits block 172 on branch 173 to request repeat entry 174, and the caller is requested to reenter his ascending and descending register readings by pressing buttons 208 and 210 on keypad 204. If on the third pass, through these decision blocks, a sum of registers inequality is still detected, the program exits third pass 172 on branch 176 to request dial 165, and the caller in invited to call for human assistance.

When the program exits decision blocks 178, 180 or 181 on branch 187, computer 120 asks the caller in block 101 for the amount of funds or amount of dollars that the caller wants the cellular telephone 3 to be refilled. The foregoing amount is inputted to block 102 from cellular telephone 3. Computer 120 checks the callers account, as represented by sufficient dollar 190, to determine if his account has a sufficient credit balance to pay for the increment of the funds or units with which he is seeking to recharge cellular telephone 3. If the credit balance is found to be insufficient, the program exits block 190 to connect the A, which is common to connect the A at branch 176 leading to block 165, wherein computer 120 formulates, via the voice answer unit 122, the voice transmission inviting the caller to call for human assistance.

When computer 120 determines that the caller has an adequate credit balance, the program exits block 190 and checks will descending register overflow 194.

In decision block 194 computer 120 checks to see, that the additional increment of funds or units which the caller is being given access to will not overflow descending register 18. If block 194 determines that descending register 18 will not overflow the program proceeds to create new access code block 196.

If computer 120 determines that descending register 18 overflows, will occur, the program exits block 194, to connection A and thence to Request Dial 165, requesting the caller to call for human assistance.

Having cleared all the described checks, computer 120 is now programmed to provide a new access code number for cellular telephone 3 identified by the cellular telephone number entered by the caller. There are of course a number of ways in which this can be done. For example, computer 120 may store in controller 202 for each remote cellular telephone 3, serviced by data center 10 the same random sequence of combinations as are access codes. Computer 120 would then automatically retrieve the next access code in sequence from its memory for issuance to the caller. This approach has the distinct drawback of taking up inordinate amounts of computer memory. A more practical approach is to utilize one of the many known random number generator sub-routines, as generally indicated by create new access code block 196. In either case, the new access code is stored in computer 120 memory, block 219 and the new access code is transferred to cellular telephone 3 controller 202 by block 216.

It is understood that the random number generation method used in calculating each new access code of the random sequence (block 196) is also used in preparing the memory of computer 120 to accommodate the new access code. Thus, the sub-routine 196 and the particular access code in controller 202 for the identified cellular telephone to be recharged, each progress through the same unique random sequence of combinations in tandem.

Prior to the transmission of the new access code to the caller, the computer 120 stores new: ascending register values, descending register values; and the new access code as indicated at 219, wherein, the callers account and cellular telephone information, held in memory are also updated. While computer 120's memory may be organized in a number of ways, preferably each cellular telephone 3 is allotted a block of memory location addressed by a unique cellular telephone number which is entered by the called in accordance with accept phone number block 155. Each phone number is also allotted a block of memory locations addressed by a unique access code number, as entered in accordance with block 142. In each cellular telephone number addressed memory block is stored the access code number to which that identified cellular telephone belongs. As represented by decision block 156, the computer 120 in effect, determines that the entered cellular telephone number is not only stored in computer 120's memory, but also crossed checked to determine that the identified cellular telephone previously entered access code number before preceding to that part of the program calling for entry of the ascending register 18 reading represented by output block 160. Stored in each account number address block is the credit balance of that particular account. This credit balance is debited in sub-routine 219 with the increment of funds or units to which the caller is given access when the function represented by output block 218 is executed. This credit balance is credited by the entry into computer 120 of payments submitted by the caller. Deficiency of this stored credit balance figure is checked by decision block 190 prior to the calculation of the new access code number in subroutine 196.

In each cellular telephone account, memory block, is also stored the amount of funds or units by which that particular cellular telephone was recharged. It being understood that the amount of funds or units incremented may vary from cellular telephone to cellular telephone. Also stored in each cellular telephone number memory block is the ascending register and descending register sizes for that particular telephone. This information is used in decision blocks 180, 184 and 194. Except for the credit balance figure for each account, the above data remains constant, as stored in memory. The remaining data stored in memory, under each cellular telephone number is variable data which is updated pursuant to sub-routine 219. This data includes the updated ascending and descending register 18 readings as entered by respectively pressing buttons 208 and 210, the new random access code number, derived by the subroutine in block 196.

Once the new access code number is transmitted to the caller (block 218), the computer 120 is conditioned to accept an entry of the acknowledgment of the access code (the caller presses button 213 on cellular telephone 3) in input block 220. Computer 120 goes through a time-out function awaiting the entry of the access code number. If, at the end of the time out function, no access code number has been received, the program tries again and goes to three or less attempts 222 to determine if this is the third pass. If three or less attempts have been made to reenter the new access code number, the program precedes to transfer new access code number 218 to reinitiate the transfer access code number sequence. After three unsuccessful attempts have been made the program precedes to connection A on branch 176 and thence to request dial 165 in order to ask the caller to phone for human assistance.

If the access code number acknowledgment of code number is received the program precedes to hang up 228.

The above specification describes a new and improved cellular telecommunications systems that utilizes encryption and employs encrypted seed number signals for access and payment. It is realized that the above description may indicate to those skilled in the art additional ways in which the principles of this invention may be used without departing from the spirit. It is, therefore, intended that this invention be limited only by the scope of the appended claims.

What is claimed is:

1. A method for paying for the use of a cellular telephone, said method comprising steps of:
    connecting a cellular telephone to a telephone network when one or more encrypted authentication signals are the same;
    answering the connected cellular telephone call from a cellular telephone user to establish two-way communication;
    formulating a response for transmission to the user requesting the input of data, that includes an access code number uniquely identifying the cellular telephone to be recharged with funds or units;
    processing at a central location the input data, upon receipt, to check the authenticity of the call;
    determining at a central location a new access code for each request for additional payment that uniquely identifies the cellular telephone;
    updating the user's file at a central location and in the cellular telephone to reflect the fact that the identified cellular telephone is to be recharged with additional funds or units; and
    transmitting the amount of funds or units requested by the caller and the new access code.

2. The method claimed in claim 1, wherein the cellular telephone is equipped with ascending and descending registers, which further include the steps of:
    formulating a request for the transmission to the caller requesting the input of the numeric contents of the ascending and descending registers of the identified cellular telephone;
    summing the contents of the ascending and descending registers and comparing this total with the total of these registers held in computer memory as a result of the previous recharging of the identified cellular telephone;
    upon the detection of the equality there between, preceding with the determination with the next access code; and
    said updating step including storing in the computer memory the contents of the ascending and descending registers as entered.

3. The method claimed in claim 2, wherein the computer memory also stores the current credit balance of each cellular telephone user's account and the dollar amount to which the cellular telephone may be recharged.

4. The method claimed in claim 3, further including the steps of:
    prior to proceeding to the determination of the next access code, checking the credit balance of the user's account to determine if the user has sufficient funds on deposit or sufficient credit to cover the amount of funds or units requested by the user.

5. The method claimed in claim 2, which further includes the steps of:
    in the event an inequality is detected between the sum of registers n the cellular telephone and the sum of registers stored in computer memory, checking to determine if the ascending register of the identified cellular telephone overflowed since its previous recharging by comparing the entered cellular telephone sum of registers total with the stored registers computer readings minus ascending register size and if equality is then detected, proceeding to the determining a new access code step.

6. The method claimed in claim 2, wherein the access code number issued on the previous occasion when the identified cellular telephone sought to be recharged is stored in computer memory, which further includes in the event inequality is detected between the sum of the registers in the cellular telephone and in the sum of the registers stored in the computer memory the steps of:
    checking to determine if the identified cellular telephone was actually recharged on that previous occasion on the basis of the stored cellular telephone and stored register readings and the amount of units or funds by which the identified cellular telephone may be recharged, and if not;
    retrieving the stored access code from memory for transmission to the cellular telephone without executing the next determining a new access code step.

7. The method claimed in claim 1, wherein the cellular telephone is equipped with one or more registers, which further include the steps of:
    formulating a request for the transmission to the caller requesting the input of the numeric contents of the registers of the identified cellular telephone;

summing the contents of the registers and comparing this total with the total of these registers held in computer memory as a result of the previous recharging of the identified cellular telephone;

upon the detection of the equality there between, preceding with the determination with the next access code; and said updating step including storing in the computer memory the contents of the registers as entered.

8. The method claimed in claim 1, wherein the step of determining a new access code further includes the steps of:

using a random number generator for determining a new access code.

9. A system for paying for the usage of a cellular telephone, said system comprising:

means for connecting a cellular telephone to a telephone network when one or more encrypted authentication signals are equal;

means located at a site remote from the cellular telephone for generating one or more challenge signals;

means located in a cellular telephone for generating a response to the challenge signals;

means for recomputing a new challenge signal upon completion of generating a response to the challenge signal;

means for comparing the challenge signals to the responses to determine the identity and authenticity of the cellular telephone;

means for transferring funds or units to the cellular telephone; and means located at a site remote from the cellular telephone for recording the transferred funds or units.

10. The system claimed in claim 9, wherein said means for connecting comprises:

means contained within the cellular telephone for generating an encrypted number that specifies to the cellular telephone containing said means;

means coupled to the base station for receiving the encrypted number generated by said means;

means contained within the base station for generating an encrypted number that is unique to the cellular telephone communicating with the base station; and means contained within the base station for comparing the encrypted number generated by said means contained within the cellular telephone with the encrypted number generated by said means contained within the base station, so that if the encrypted number generated by said means contained within the cellular telephone is the same as the encrypted number generated by said means contained within the base station, the cellular telephone is connected to the network to complete a call.

11. The system claimed in claim 10, wherein said means for generating an encrypted number further includes:

means for generating an access code that changes upon the transferring of funds from the cellular telephone to the cite remote from the cellular telephone.

12. The system claimed in claim 11, wherein said access code generating means is a random number generator.

13. The system claimed in claim 11, wherein said access code generating means is a list of persecuted numbers that are stored in the cellular telephone and in the site remote from the cellular telephone.

14. The system claimed in claim 9, wherein said means for generating one or more challenge signals is a voice answer back unit.

15. The system claimed in claim 9, wherein said means for generating one or more challenge signals is a interrogator.

16. The system claimed in claim 5, wherein said means for generating a response to the challenge signals comprises:

means for receiving the challenge signals;

means coupled to said challenge means for interrupting the challenged signals;

means responsive to said interrupting means for formulating the correct response to said interrupting means; and means for transmitting the correct response to the challenge signals to said means for generating challenge signals.

17. The system claimed in claim 9, wherein said means for means for transferring funds or units comprises:

means for requesting the amount of funds or units the cellular telephone user desires;

means responsive to said requesting means for storing the desired amount of funds or units in the cellular telephone;

means responsive to said requesting means for storing the desired amount of funds or units at a site remote from the cellular telephone; and means coupled to said cellular telephone storage means for reducing the account balance of the user of the cellular telephone by the amount of funds or units requested by the cellular telephone user.

* * * * *